United States Patent

Verdier

[15] 3,682,220
[45] Aug. 8, 1972

[54] TREAD FOR WIDE TIRE

[72] Inventor: Henri Verdier, Beauregard-L'Eveque, France

[73] Assignee: Compagnie Generale Des Etablissements Michelin raison sociale Michelin & Cie, Clermont-Ferrand, Puy-de-Dome, France

[22] Filed: June 10, 1970

[21] Appl. No.: 45,106

[52] U.S. Cl. ............ 152/209 D, 152/DIG. 3, 152/324
[51] Int. Cl. .................... B60c 11/06, B60c 11/08
[58] Field of Search ........................... 152/209 R, 152/209 D, Dig. 3, Dig. 4, 152/324, 325

[56] References Cited

UNITED STATES PATENTS

| 3,104,693 | 9/1963 | Bolenbach | 152/209 R |
| 3,498,354 | 3/1970 | Boileau | 152/209 R |
| 1,254,884 | 1/1918 | Chinnock | 152/209 R |
| 3,055,410 | 9/1962 | Caulkins | 152/209 R |
| 2,604,920 | 7/1952 | Kirby | 152/209 R |
| 2,260,193 | 10/1941 | Overman | 152/209 R |
| 2,265,543 | 12/1941 | Overman | 152/209 R |
| 3,364,965 | 1/1968 | Oubridge | 152/209 R |
| 3,411,559 | 11/1968 | Verdier | 152/209 R |
| 3,556,191 | 1/1971 | Mills | 152/209 R |

FOREIGN PATENTS OR APPLICATIONS

| 1,163,341 | 4/1958 | France | 152/209 R |

*Primary Examiner*—Drayton E. Hoffman
*Attorney*—Brumbaugh, Graves, Donohue & Raymond

[57] ABSTRACT

A wide tire tread is divided by two continuous longitudinal grooves into three circumferential zones of substantially equal width. Each of the longitudinal grooves has a width at least equal to its depth, and each of the circumferential zones comprises grooves extending in a non-longitudinal direction. This renders the circumferential zones flexible for intimate contact with the ground, yet does not unduly carve up and weaken the tread.

7 Claims, 7 Drawing Figures

FIG. 1
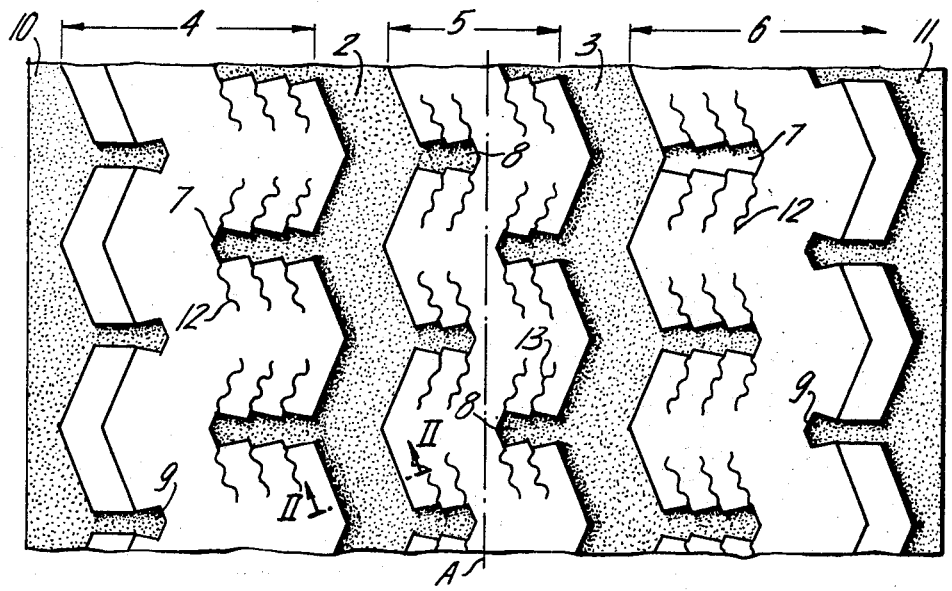
FIG. 3
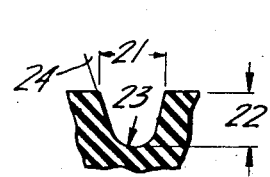
FIG. 2
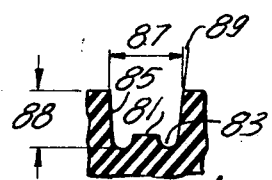
FIG. 4
INVENTOR
HENRI VERDIER INVENTOR
HENRI VERDIER
his ATTORNEYS

TREAD FOR WIDE TIRE

BACKGROUND OF THE INVENTION

This invention relates to tires and, more particularly, to novel and highly-effective treads for new or retreaded tires having great tread width.

Because of the widening of tire treads and the increase in the speed and power of vehicles, traction on wet roads and evacuation of the water between the tread and the ground require special attention. The tendency has been to increase the number of circumferential grooves. However, the effectiveness of these circumferential grooves does not increase in proportion to their number, especially as speed increases. Moreover, a substantially uniform distribution of many circumferential grooves over the width of the tread is not favorable in view of the distribution of forces on the ground, which is not uniform in the transverse direction.

SUMMARY OF THE INVENTION

It is an object of the present invention to improve the traction of tire treads on wet roads without increasing the number of grooves and without weakening the treads as has been done in conventional tires.

The tire in accordance with the invention has a tread comprising a network of grooves ensuring the draining of water in the area of contact with the ground. The tread is divided by two longitudinal grooves each wider than it is deep into three circumferential zones of substantially equal width, made flexible by means of grooves running in a non-longitudinal direction: i.e., in a crosswise or oblique direction.

The presence of two grooves that are both wide and deep and run along ridges rendered extensible and compressible by crosswise or oblique grooves assures effective drainage of the area of contact, even at high speeds and with wide treads. The depth of each groove should extend substantially over the entire thickness of the tread, as is usual. The width of each groove at the surface, i.e., the distance between the ridges bordering the grooves at the level of the surface of rolling, should at least equal their depth, i.e., equal approximately the thickness of the tread.

The great width of the longitudinal grooves required by the present invention could under some circumstances result in a weakening of the tread. In order to avoid such a risk, either one of the following additional features in accordance with the invention may be utilized.

The first feature consists in that the lateral walls of the longitudinal grooves are given a backing-off angle (i.e. an angle with the perpendicular to the surface of rolling) that is comparatively large, and in any case larger than 12°, measured on an unloaded tire. The backing-off angle is preferably within the range of 12° to 30°. The bottom of the longitudinal grooves connecting the inclined lateral walls is of rounded shape. The inclination of the lateral walls results in that the width of the groove is reduced gradually from the surface of rolling in the direction towards the axis of rolling. Moreover, the inclination seems to provide improved effectiveness in the draining of the area of contact.

The second feature consists in that the transverse cross section of the longitudinal grooves is formed with a coping in relief. For example, it can have the shape of a W; i.e., the lateral walls are formed with no backing-off angle or with a small backing-off angle ranging from 2° to 8°, and a coping in relief is formed on the bottom. Without restricting the depth or surface width of the longitudinal grooves, the coping has the effect of consolidating the bottom. It too seems to provide an improvement in drainage of the area of contact. The coping can also have a triangular, trapezoidal or rectangular cross section and be equidistant from the two lateral walls. It may also be placed against one of the walls and form a tier. It connects in a rounded shape with the bottom of the longitudinal channels.

The ratio of width to depth of the channels ranges preferably from 1.0 to 2.5. Moreover, the backing-off angle of the walls of the channels with a V-shaped cross section ranges from 12° to 30°. Finally, the coping in relief has a width preferably less than half of the maximum width of the longitudinal grooves and a depth preferably less than one third of the depth of the longitudinal grooves. The longitudinal grooves may have a zigzag or wavy shape.

Moreover, the two longitudinal grooves may have cross sections which in type, dimension and/or form are different, especially if it is desired to take into account ground pressures which are higher on one side than on the other of the median plane of the tire for any reason whatever.

As has been stated, the longitudinal grooves should be combined with crosswise or oblique (non-longitudinal) grooves in the adjacent ridges. It is advisable to reduce the longitudinal rigidity of these ridges sufficiently to facilitate intimate contact with the ground by the ridges and the collecting of water in the longitudinal grooves. The transverse or oblique grooves end either in the longitudinal channels or in the sidewalls, provide the needed mobility of the longitudinal ridges, and form water-draining conduits. Preferably, the crosswise or oblique grooves are formed with dead ends: i.e., they open into the sidewalls or into the longitudinal channels at only one of their ends. This arrangement makes it possible to ensure circumferential continuity of the center ridge and of the two lateral ridges, which favors a quiet rolling of the tire and better resistance to wear and tear. The crosswise grooves may be arranged either perpendicularly or obliquely with respect to the median plane: i.e., they are non-longitudinal. Their depth is preferably equal to the depth of the longitudinal channels: i.e., substantially equal to the thickness of the tread. Their width is close to half their depth. However, this width may be as low as 2 mm, especially in the center zone.

The mobility of the center and lateral ridges may be even more enhanced by means of very narrow cuts, slits, slashes, or notches prolonging or separate from the crosswise grooves.

The penetration into the water of a tire with a tread in accordance with the invention so that the ridges make good contact with the ground and the effective draining of the area of contact can be improved even further by constituting the meridian profile of the three circumferential zones in relief by arcs of a circle with the same center, the radius of the center zone being larger than the radii of the lateral zones. Preferably, the radius of the center zone differs from the radii of the lateral zones by 1 to 3 mm.

BRIEF DESCRIPTION OF THE DRAWINGS

An understanding of additional aspects of the invention can be gained from a consideration of the following detailed description of the preferred embodiments thereof, in conjunction with the appended figures of the drawing, wherein:

FIG. 1 is a developed plan view of the tread portion of a tire in accordance with the invention, showing a sector of approximately 16°, with two longitudinal grooves having a V-shaped cross section;

FIG. 2 is a cross section through the line II—II of FIG. 1, looking in the direction of the arrows and showing one of the longitudinal grooves with a V-shaped cross section in FIG. 1;

FIG. 3 is a developed plan view of a sector of the tread of a tire in accordance with the invention, showing a sector of approximately 15°, with two longitudinal grooves having a W-shaped cross section;

FIG. 4 is a cross section through the line IV—IV of FIG. 3, looking in the direction of the arrows and showing one of the longitudinal grooves with a W-shaped cross section in FIG. 3;

DESCRIPTION OF THE PREFERRED EMBODIMENTS

Figure 5:
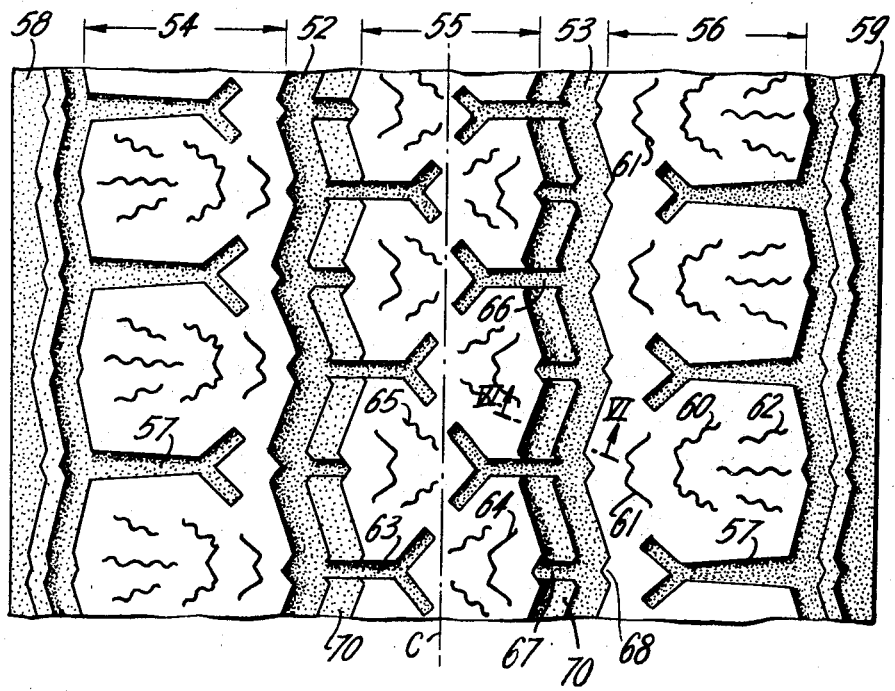
FIG. 5 is a developed plan view of a sector of the tread of a tire in accordance with the invention, showing a sector of approximately 18°, with two longitudinal grooves having a tiered cross section.

FIG. 1 is a partial plan view of a tire tread in accordance with the invention. The tread has a longitudinal axis A and is divided by two longitudinal channels or grooves 2 and 3, laid out in zigzag and having a V-shaped cross section as shown in FIG. 2. There are thus three circumferential ridges or zones in relief 4, 5 and 6. Each of the outer zones 4 and 6 comprises crosswise grooves or cutouts 7 in an oak leaf pattern, opening solely into either the channel 3 or the channel 2, and also comprises transverse grooves such as 9, opening solely into the sidewalls 10, 11 of the tire. The center zone 5 also comprises alternating crosswise grooves 8 in an oakleaf design, opening either into channel 2 or into channel 3 without, however, traversing the center zone 5. As an example, the grooves 7, 8 or 9 have a depth of 8.5 mm and an average width of 4 to 5 mm. Each groove 7 is connected with three notches or slits 12, while each groove 8 is connected with two slits 13.

FIG. 2 shows a perpendicular cross section through the line II—II across the V-shaped circumferential channel 2. As an example, the channel 2 has a width 21 of 12 mm on the surface, its depth is 8.5 mm, the rounded portion 23 has a radius of 4.3 mm, and the angle of inclination or backing-off angle 24 is 19°.

FIG. 3 shows another tire tread in accordance with the invention. This tread has a longitudinal axis B and is divided by two longitudinal grooves 31 and 32 in a zigzag design. The channels 31 and 32 have a W-shaped cross section, as show in FIG. 4, and divide the tread into three longitudinal zones in relief 33, 34 and 35. Each of the longitudinal zones 33, 34 and 35 comprise crosswise (non-longitudinal) grooves in a Y-design. The crosswise grooves 36 of the center zone 34 open either into the channel 31 or into the channel 32, without, however, traversing the zone 34. The outer zone 33 has transverse (non-longitudinal) grooves 37 opening into the channel 31, and 38 opening into the sidewall 39 of the tire. The outer zone 35 has cross (non-longitudinal) grooves 40 opening into the channel 32, and 41 opening into the sidewall 42 opposite the sidewall 39. The rubber intermediate portion 43 separating the grooves 37 and 38 of the zone 33 is visibly shorter than the rubber intermediate part 44 separating the grooves 40 and 41 of the zone 35. This suffices to introduce an asymmetry of behavior of a tire provided with a tread in accordance with the invention. As an example, the rubber interval 43 has a length of 3 mm measured perpendicularly to its walls while the interval 44 is 12 mm long. The transverse grooves 36, 37 and 38 and 40 and 41 have a width of from 3.5 to 4.5 mm for a depth of 8.5 mm. The zones in relief 33 to 35 have furthermore the wavy notches 45.

The cross section of the channel 32 has, a shown in FIG. 3, a W-shaped profile because of the presence, on the bottom 83 of channel 32, of a substantially trapezoidal coping 81, connected by two round portions 83 to the walls 85. As an example, the channel 31 has a width 87 at the surface of 10.5 mm and a depth 88 of 8.5 mm. The rounded portions 83 have a radium of 1.5 mm and the coping 81 has a width of 4 mm and a depth of approximately 1.6 mm. The backing-off angle 89 of the walls 85 is 2°.

Figure 6:
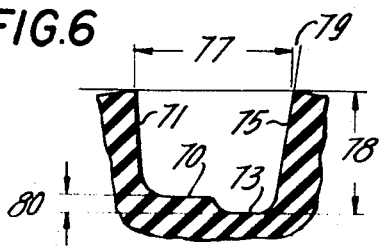
FIG. 6, drawn on a larger scale, is a cross section through the line VI—VI of FIG. 5, looking in the direction of the arrows and showing one of the circumferential grooves in tier-shaped section of FIG. 5.

FIG. 5 is a partial view of a third tread of a tire in accordance with the invention. This tread has a longitudinal axis C and is divided by two longitudinal channels or grooves 52 and 53 in a zigzag design. The channels 52 and 53 have a tiered cross section, as shown in FIG. 6. There are thus three longitudinal zones in relief 54, 55 and 56. The two outer longitudinal zones 54 and 56 are formed with cross (non-longitudinal) grooves 57, in a Y-design, opening solely into the sidewalls 58 and 59 of the tire and are also provided with the M-shaped notches 60 and 61 and wave-shaped notches 62. The center zone 55, too, has cross (non-longitudinal) grooves 63 in a Y-pattern opening alternatingly into the channel 52 or the channel 53. This zone 55, too, comprises M-shaped notches 64 and wavy notches 65. As an example, the transverse grooves 57 and 63 are 2.5 mm wide and 8.5 mm deep.

FIG. 6 is a cross section through the line VI—VI of the groove 53 in FIG. 5. The coping 70 is placed against the wall 71 forming part of the center zone 55. The same is true of the coping 70 of groove 52. As a result, the base of each of the longitudinal grooves 52 and 53 is tiered. Thus, the base of the groove 53 has the profile of a tier connected on one side with the wall 71 by a round portion and on the other side to the bottom 73 likewise by a round portion. The wall 75 opposite the wall 71 is likewise connected to the bottom 73 by a rounded portion. As an example, the channel 53 has a surface width 77 of 11.3 mm, and a depth 78 of 8.5 mm. The various rounded portions have a radius of 2 mm. The walls 71 and 75 have a backing-off angle 79 of 5°. The tier 70 has a height 80 of 1 mm and occupies half of the width of the base 73 of the channel 53. As may be seen in FIG. 5, the tier 70 is interrupted at 66 by continuations of the grooves, such as 63, and at 67, opposite a small projection, such as 68, of an outer zone 54 or 56.

Figure 7:
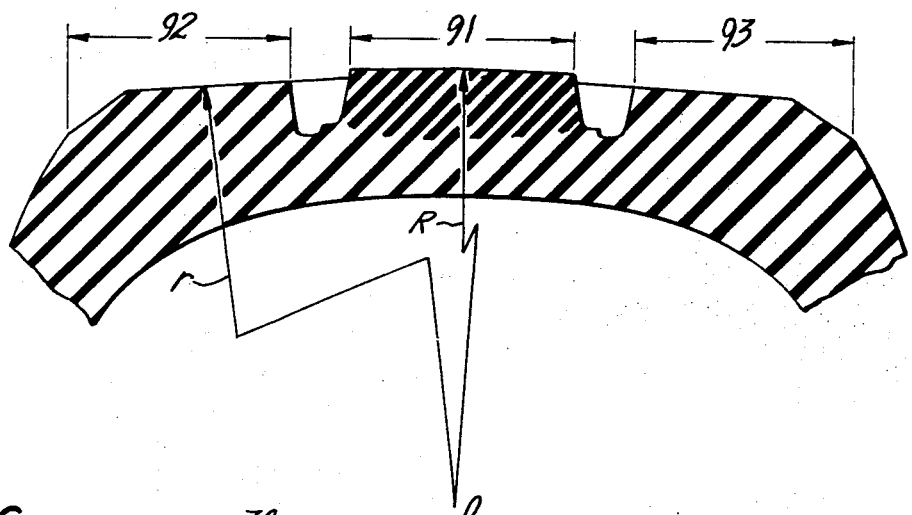
FIG. 7 is a radial sectional view showing the meridian profile of a tire in accordance with the invention, the center circumferential zone of which projects slightly as compared to the lateral zones.

FIG. 7 is a radial section showing the meridian profile of the tread of a tire in accordance with the invention. The circumferential center zone 91 slightly projects in relation to the outer zones 92 and 93. The arcs of the circles tangential to the two outer zones 92 and 93 have a radius $r$, and the arc of the circle tangential to the center zone 91 has a radius $R$ which is approximately 2 mm larger than the radius $r$. The three arcs have a common center 0 located on the axis of symmetry of the meridian cross section shown. This embodiment of the invention is especially suitable for use in treads comprising two different qualities of rubber, one for the center zone 91 (shown in denser hatching) and the other one for the outer zones 92 and 93.

Thus there is provided in accordance with the invention a novel and highly-effective tread particularly adapted to ensure excellent traction of tires of great width on wet roads, in combination with the great tread strength necessary for safe travel at high speed.

Many modifications of the representative embodiments of the invention disclosed herein will readily occur to those skilled in the art upon study of the present specification. Accordingly, the invention is to be construed as including all such modifications as fall within the scope of the appended claims.

I claim:

1. A tire especially adapted for high-speed travel on wet roads comprising a tread formed with a network of grooves ensuring drainage of water in the area of contact of the tread with the ground, characterized in that the tread is wide and divided by two wide, continuous longitudinal grooves into three circumferential zones of substantially equal width and similar pattern, each of said longitudinal grooves serving as a main water drain and having a width which at the tread surface is at least as great as the depth of such groove, and each of said circumferential zones being circumferentially continuous and being formed with dead-end cross grooves extending in a non-longitudinal direction, said cross grooves of each circumferential zone opening out at only one edge of said circumferential zone and having substantially the same depth as said wide grooves and a width not substantially exceeding half the depth of said wide grooves, further comprising means reinforcing the bottoms of said wide grooves, said reinforcing means reducing the width of the bottoms of said wide grooves by not more than one-half, said circumferential zones being thus rendered flexible for intimate contact with the ground and being drained of water by said longitudinal and non-longitudinal grooves when said tire rolls on a wet surface.

2. A tire according to claim 1 wherein the walls of said longitudinal grooves are formed with a backing-off angle of at least 12°.

3. A tire according to claim 2 wherein said backing-off angle is within the range of 12° to 30°.

4. A tire according to claim 1 wherein said reinforcing means comprises a coping in relief.

5. A tire according to claim 4 wherein said coping has a height not exceeding one-third the depth of said longitudinal grooves.

6. A tire according to claim 1 wherein the meridian profile of the three circumferential zones is coincident with arcs of circles having the same center, the radius of the center zone being larger than the radii of the outer zones.

7. A tire according to claim 6 wherein the difference between the radius of the center zone and the radii of the outer zones is within the range of 1 to 3 mm.

* * * * *